US012054001B2

United States Patent
Barroso et al.

(10) Patent No.: US 12,054,001 B2
(45) Date of Patent: Aug. 6, 2024

(54) PROCESS FOR THE PRODUCTION OF AN IMPREGNATED WOOD PIECE, IMPREGNATED WOOD PIECE OBTAINABLE BY SUCH A PROCESS AND PENCIL HAVING A SHEATH MADE OF SUCH AN IMPREGNATED WOOD PIECE

(71) Applicant: FABER-CASTELL AG, Stein (DE)

(72) Inventors: Vladimir A. Bazan Barroso, São Carlos (BR); Felipe Zatt Schardosin, São Carlos (BR); Tatiane de Mattos Amadio, São Carlos (BR); Gerhard Lugert, Nuremberg (DE)

(73) Assignee: FABER-CASTELL AG, Stein (DE)

( * ) Notice: Subject to any disclaimer, the term of this patent is extended or adjusted under 35 U.S.C. 154(b) by 83 days.

(21) Appl. No.: 17/814,144

(22) Filed: Jul. 21, 2022

(65) Prior Publication Data
US 2023/0027876 A1 Jan. 26, 2023

(30) Foreign Application Priority Data
Jul. 22, 2021 (EP) ..................... 21187319

(51) Int. Cl.
*B43K 19/14* (2006.01)
*B27K 3/08* (2006.01)
*B27K 3/36* (2006.01)
*B43K 19/16* (2006.01)

(52) U.S. Cl.
CPC ............. *B43K 19/14* (2013.01); *B27K 3/08* (2013.01); *B27K 3/36* (2013.01); *B43K 19/16* (2013.01)

(58) Field of Classification Search
CPC ........ B43K 19/14; B43K 19/00; B43K 19/02; B43K 19/145; B43K 19/16; B27K 3/08; B27K 3/36; B27K 3/0207; B27K 3/34; B27K 3/0214
USPC ..................................... 401/49, 52
See application file for complete search history.

(56) References Cited

U.S. PATENT DOCUMENTS

| | | | |
|---|---|---|---|
| 2008/0193785 A1* | 8/2008 | Kingma | C08L 97/02 427/317 |
| 2008/0223360 A1 | 9/2008 | Kingma et al. | |
| 2019/0119507 A1 | 4/2019 | Reinert | |

FOREIGN PATENT DOCUMENTS

| | | |
|---|---|---|
| CN | 106363731 A | 2/2017 |
| CN | 108839192 A | 11/2018 |

OTHER PUBLICATIONS

European Search Report and Written Opinion mailed on Jan. 24, 2022, in European Application No. 21187319.5-1104, 15 pages.
Emmerich et al., "Wood Modification with DMDHEU (1.3-dimethylol-4.5-dihydroxyethyleneurea)—State of the art, recent research activities and future perspectives", Wood Material Science & Engineering vol. 14, No. 1, 2019, pp. 3-18.
Scholz et al., "Full Impregnation of Modified Wood with Wax", Eur. J. Wood Prod, vol. 70, No. 7, 2012, pp. 91-98.

* cited by examiner

*Primary Examiner* — David J Walczak
(74) *Attorney, Agent, or Firm* — Keller Preece PLLC

(57) ABSTRACT

A process for the production of impregnated wood pieces for use in pencil production, and pencils with shafts including such impregnated wood pieces, wherein the process comprises two process stages, namely a) a first process stage, comprising
 a first impregnation step, in which an untreated wood piece is at least partially, impregnated with a first aqueous impregnating solution of an impregnating agent selected from the group consisting of 1,3-dimethylol-4,5-dihydroxyethylene urea or a derivative or modification thereof, and a catalyst, and
 a subsequent curing step, in which the impregnated wood piece is cured in a hot steam atmosphere at an elevated temperature above 100° C., and
b) a second process stage comprising a second impregnation step, whereby the impregnated, cured wood piece is at least partially impregnated with a second aqueous impregnating solution of a wax emulsion paraffin based as an impregnating agent.

18 Claims, No Drawings

PROCESS FOR THE PRODUCTION OF AN IMPREGNATED WOOD PIECE, IMPREGNATED WOOD PIECE OBTAINABLE BY SUCH A PROCESS AND PENCIL HAVING A SHEATH MADE OF SUCH AN IMPREGNATED WOOD PIECE

CROSS-REFERENCE TO RELATED APPLICATIONS

This application claims priority to European Patent Application No. 21187319.5 filed Jul. 22, 2021. The entire contents of the foregoing patent application is hereby incorporated by reference.

BACKGROUND OF THE INVENTION

1. Technical Field

The present invention relates to a process for production of an impregnated wood piece, an impregnated wood piece obtainable by such a process and a pencil having a sheath made from or comprising such an impregnated wood piece.

Pencils for writing and drawing are constructed of a narrow, solid lead that is surrounded by a shaft to prevent the lead from being broken or marking an user's hand. The shaft is typically made of wood, a wood-based material or a wood plastic compound material (WPCs).

In particular, any *Pinus* spp, such as *Pinus caribaea* var *hondurensis* or *Pinus oocarpa* wood, is used to case the pencils. Due to the short cycle of growth, around 20 years, part of the wood generated is less stable to climatic variations in its dimensions than other woods used in the production of pencils. This characteristic may in some climatic conditions result in unwanted warped pencils. *Pinus* spp wood presents a density variation along the radius of the tree due to the formation of growth rings, the higher density in late wood rings may also result in pencils that require greater effort to be sharpened.

Therefore, there is a need to improve the wood quality for use in pencil production to avoid unwanted warpage of the pencils and to reduce the torque for sharpening.

2. Background and Relevant Art

U.S. Pat. No. 7,846,508 B2 discloses a method for the treatment of surfaces of wood or woodbase materials with surface treatment compositions, and the timbers or woodbase materials thus treated by impregnating with a curable aqueous composition of α) low molecular weight compounds V which have at least two N-bonded groups and/or β) precondensates of the compound V and/or γ) reaction products or mixtures of the compound V with at least one alcohol which is $C_1$-$C_6$-alkanols, $C_2$-$C_6$-polyols or oligoalkylene glycols; treating that impregnated material at elevated temperature and treating at least one surface of the wood or woodbase material to be treated with a surface treatment composition.

WO 2004/033170 A1 for example discloses a process for the production of a wood body having high durability, dimensional stability and surface hardness, wherein an untreated wood body is impregnated with an aqueous solution of an impregnating agent and a catalyst and then hardened at elevated temperature. The wood body obtained by such a process is suitable for an outdoor use, where the wood is exposed to moisture and weathering.

Summary

It is an object of the present invention to provide a process for production of a wood piece or wood material, obtainable by such a process and a pencil having a sheath made from or comprising such a wood piece or wood material, wherein it has improved properties, in particular with regard to a use in pencil production.

DETAILED DESCRIPTION

The first object is achieved through the process according to claim 1. A process for the production of an impregnated wood piece or wood material, in particular for use in pencil production, more particular for use as a sheath of a pencil, comprises two process stages, whereby an untreated wood piece or wood material is provided, chemically modified in a first process stage and wax impregnated in a second process stage.

The first process stage comprises a first impregnation step, in which an untreated wood piece or wood material is at least partially, in particular fully impregnated with a first aqueous impregnating solution comprising an impregnating agent selected from the group consisting of 1,3-dimethylol-4,5-dihydroxy-ethyleneurea (known as "DMDHEU"), a derivative or modification thereof, alone or in any combination thereof, and a catalyst. Derivatives or modifications of DMDHEU are for example modified Dimethylol-dihydroxy-ethyleneurea (known as "mDMDHEU") that is formaldehyde-reduced or Dimethyldihydroxy-ethyleneurea (known as "DMeDHEU") that is formaldehyde-free. These impregnating agents are so-called reactant crosslinkers. A person skilled in the art knows further derivatives or modifications of DMDHEU suitable for the intended use, for example sold under the trademark names Fixapret[1] CP, ELF, ELFB, CNR, CV, CL, CM and ECO or Arkofix[1] NF and NZF.

The first process stage further comprises a subsequent curing step (or: hardening step), in which the (DMDHEU-) impregnated wood piece or wood material is cured in a hot steam atmosphere at an elevated temperature above 100° C. The curing step is thus carried out while maintaining humid conditions to avoid a drying of the impregnating agent during the hardening and to ensure that the impregnating agent reacts with itself and the wood piece or wood material. The curing step is preferably carried out inside a kiln.

After the first process stage, a chemically modified wood piece or wood material is obtained, hereinafter also referred to as once impregnated, cured wood piece or DMDHEU impregnated, cured wood piece, wherein the latter does also include mDMDHEU or DMeDHEU impregnated, cured wood pieces or the like.

The second process stage comprises a second impregnation step, whereby the DMDHEU impregnated, cured wood piece or wood material is at least partially impregnated with a second aqueous impregnating solution of a wax emulsion paraffin based as an impregnating agent. In other words: The wood piece or wood material impregnated with the first aqueous impregnating solution and subsequently cured is at least partially impregnated with a paraffin wax emulsion.

It is therefore an idea of the invention to provide a double impregnated wood piece or wood material that is subsequently impregnated with two different impregnating solutions. For decades, researches have been made to improve the wood quality of wood. It was surprisingly found out, that the use of DMDHEU and derivatives in a first impregnation step and the use of a paraffin wax in a second impregnation step in combination lead to a double impregnated wood piece or wood material having improved properties with regard to a higher dimensional stability, durability and surface hardness in comparison with untreated or once impregnated wood materials. This improvement is in particular advantageous when the wood piece or wood material is used in pencil production, in particular when used as a shaft of pencils, as the pencils produced require lower torque for sharpening and show a lower pencil warpage. This is due to a chemical modification of cell wall constituents, especially breakage, replacement and blockage of hydroxyls what results in positive effects on the reduction of warped pencils and reduction of effort required to sharpen a pencil.

Impregnating agents used according to the present invention in the first impregnating solution are sold, for example, under the trademark names Fixapret[1] CP, ELF, ELFB, CNR, CV, CL, CM and ECO or Arkofix[1] NF and NZF. A wax emulsion based on paraffin wax used in the second impregnating solution is sold, for example, under the trademark Solven Wax 140[8].

The untreated wood piece or wood material provided for the process may be available in the form of blocks, lamellas or slats. The expression "untreated" is to be understood as meaning that the wood piece or wood material has not yet been chemically modified, i.e. has not yet been impregnated with an impregnating solution.

The first aqueous impregnating solution is for example prepared in a metal tank equipped with a compatible agitator allowing the rapid homogenization of the mixture, including the impregnating agent and the catalyst and optionally further components. The mixture must be homogenized until the catalyst is completely dissolving. The second aqueous impregnating solution may also be prepared and stirred in a mixer until the paraffin wax and optionally other components are finely dispersed.

In a preferred embodiment, metal salts are used as catalyst, in particular metal salts selected from the group consisting of magnesium nitrate and/or magnesium chloride. Such catalysts are sold, for example, under the trademark Magnisal[4] or Zechstein[5].

In a preferred embodiment, the first aqueous impregnating solution may further comprise a surfactant, in particular a polyether, more particularly a siloxane based polyether is used as surfactant. Such surfactants are sold, for example, under the trademark Tegropren 5840[2], BREAK-THRU[2] or Silwet L77[3].

A preferred composition of the first aqueous impregnating solution is a solution that complies with the following concentrations:
  79.2 to 97.85 wt.-% of water,
  2.00 to 20.00% of the impregnating agent based on the solid content,
  0.05 to 0.20 wt.-% of the surfactant, and/or
  0.10 to 0.60 wt.-% of the catalyst.

In a preferred embodiment, the second aqueous impregnating solution comprises a fatty acid, in particular stearic acid, and/or ammonium hydroxide and/or a defoamer. A suitable defoamer is sold, for example, under the trademark Tego Antifoam 1488[2].

A preferred composition of the second aqueous impregnating solution of a wax emulsion paraffin based is as follows:
  92.57 to 96.57 wt.-% of water,
  1.00 to 2.30 wt.-% of stearic acid,
  0.70 to 1.40 wt.-% of ammonium hydroxide,
  1.70 to 4.00 wt.-% of a paraffin wax, and/or
  0.03 wt.-% of a defoamer.

For carrying out the first and second impregnation step, the untreated wood piece or wood material is inserted in each case into a pressure vessel with a capacity of about 17 bar, whereby the wood piece or wood material may be tied with arching tape on bales or packed in metal trolleys.

According to a preferred embodiment, the first impregnation step is carried out through a vacuum impregnation process comprising at least one vacuum step, in particular at a pressure of about 0.01 to 0.1 bar, in particular 0.05 to 0.08 bar for 15 to 30 minutes, and a high pressure step, in particular at a pressure of about 10 to 15 bar for 1 to 3 hours, whereby the untreated wood piece or wood material is at least partially impregnated at the high pressure step.

The process may comprise a first vacuum step for removing residual moisture from the wood piece or wood material to make the wood piece or wood material more receptive to the impregnating agent during the high pressure step. The process may further comprise a second vacuum step for removing residual liquid from the wood piece or wood material.

According to a further preferred embodiment, the second impregnation step is carried out through a vacuum impregnation process comprising at least one vacuum step, in particular at a pressure of about 0.01 to 0.1 bar for 15 to 30 minutes, and a high pressure step, in particular at a pressure of about 10 to 15 bar for 1 to 3 hours, whereby the once (DMDHEU) impregnated, cured wood piece or wood material is at least partially impregnated at the high pressure step.

In a preferred embodiment, the curing step is carried out inside a kiln in a hot steam atmosphere. The steam is added at a pressure of 7 to 9 bar, in particular at a pressure of 8 bar for a period between 12 and 24 hours. Thus, the wood piece or wood material is cured at an elevated temperature above 100° C. while maintaining humid conditions, in particular at a relative humidity above 50% or between 50 and 100%, respectively, in particular above 80% or 80 and 100%, respectively.

During the curing step, it is advantageous to staple the wood piece or wood material so that ventilation between them is possible and to insert them in a closed and thermally insulated metal kiln. The inside of the kiln has preferably 8 bar saturated steam sprinklers. The wood piece or wood material inside the chamber is then vaporized for a period of 12 to 24 hours so that the temperature inside the vessel reaches a temperature above 100° C.

In a preferred embodiment, the first process stage comprises one or more of the following steps carried out before the first impregnation step:

A preceding drying step for drying the untreated wood piece may be carried out, in particular a drying step carried out in a continuous dryer or a stationary drying chamber of saturated initial moisture for the humidity condition between 10 and 25%.

The raw and green, untreated wood material or wood piece may be in the form of blocks, lamellas or slats. Preferably, a cutting step for cutting the untreated, in particular dried wood piece or wood material into slats or wood boards, preferably having dimensions of 45 to 84×4 to 7×140 to 140 suitable for use in pencil productions, is carried out.

Furthermore, the untreated, in particular dried and/or cutted wood piece or wood material, in particular the slats or boards are subjected to a resting step, whereby the untreated, in particular dried and/or cutted wood piece or wood material, remains on rest for 2 to 15 days before carrying out the first impregnation step. Thereby, the moisture is evenly distributed in the wood piece or wood material.

In a preferred embodiment, the first process stage comprises a subsequent drying step for drying the once, DMDHEU impregnated, cured wood piece or wood material after the curing step. Said drying step is in particular carried out at inside the kiln with maximum final temperature of 80 to 95° C. with time between 40 and 120 hours. Alternatively, the wood piece or wood material is preferably removed from inside the kiln and dried in a continuous dryer for 50 to 120 min with a maximum temperature of 120 to 160° C. In both processes a final humidity of 10-20% is reached.

In a further preferred embodiment, the second process stage comprises a subsequent drying step for drying the double, DMDHEU and wax impregnated wood piece or wood material, in particular for 50 to 120 min with maximum temperature of 120-160° C. reaching the final humidity of 10-20%.

The second object is achieved through the impregnated wood piece (or: wood material) according to claim 12. The double impregnated wood piece or wood material is at least partially, in particular fully impregnated with a first aqueous impregnating solution of an impregnating agent selected from the group consisting of 1,3-dimethylol-4,5-dihydroxyethylene urea (DMDHEU) or a derivative or modification thereof and a catalyst, and at least partially, in particular fully impregnated with a second impregnating solution of a wax emulsion paraffin based as an impregnating agent (or: paraffin wax emulsion), and is obtainable by a process according to any of the preceding claims.

In a preferred embodiment, the impregnated wood piece or wood material is or comprises *Pinus* spp (or: pine wood), in particular *Pinus caribaea* var *hondurensis* or *Pinus oocarpa*, preferably used in pencil production.

Furthermore, the wood piece or wood material is in the form of slats or wood boards, preferably having dimensions of 45 to 84×4 to 7×140 to 186 mm suitable for use in pencil productions.

The third object is achieved through the pencil according to claim 14. The pencil has a lead and a shaft surrounding the lead, wherein the shaft is made from or comprises an impregnated wood piece according to the present invention, in particular an impregnated wood piece obtainable by a process according to the invention. The pencil, for example, may have a lead made of graphite and clay or may be a colored pencil having a colored lead.

For manufacturing the pencil or colored pencil with a wooden sheath is with the aid of wooden pieces in the form of slats or boards cut to the length of the pencil. First, parallel grooves are cut in the wooden board parallel to each other to accommodate graphite/clay or colored leads. After inserting the lead into the grooves of a first wooden board of a first wooden board, a second wooden board is placed on top of it in such a way that the grooves are located one above the other to form a receptacle for the leads. To join the two wooden boards together, glue is applied to the flat sides of the wooden boards that are to be joined together. Additional glue may be applied inside the grooves in order to achieve a good bond between the pencil or the wood to achieve a good bond between the leads and the wood. Finally, the individual pencils are separated from each other and, if necessary, machined to obtain round, triangular or hexagonal pencils. Further steps, such as the application of a lacquer, may follow.

According to a preferred embodiment, the pencil has a sharpening moment lower than 8 Ncm and/or a pencil warpage of 3.0% at maximum.

In the following, several formulations F1 to F8 according to embodiments of the invention used in a process for the production of an impregnated wood piece for use in pencil production, in particular for use as a shaft of a pencil, are listed and compared with regard to its properties with a wood piece impregnated with a wax emulsion only (Example "C").

| Component | C | F1 | F2 | F3 | F4 | F5 | F6 | F7 | F8 |
|---|---|---|---|---|---|---|---|---|---|
| Water | | 79% | 79% | 90% | 90% | 95% | 95% | 98% | 98% |
| FIXAPRET-ELF[1)] | | 20% | | 10% | | | | | |
| FIXAPRET-CP[1)] | | | | | | | 5% | | 2% |
| ARKOFIX-NF[1)] | | | 20% | | 10% | | | | |
| ARKOFIX-NZF[1)] | | | | | | | 5% | | 2% |
| Surfactant[2)] | | 0.05% | 0.05% | 0.05% | 0.05% | 0.05% | 0.20% | 0.10% | 0.20% |
| Catalyst[4) 5)] | | 0.60% | 0.60% | 0.30% | 0.30% | 0.20% | 0.20% | 0.10% | 0.10% |
| Wax emulsion | 5% | 5% | 5% | 5% | 5% | 5% | 5% | 5% | 5% |
| Pencil properties | | | | | | | | | |
| Torque (Ncm) | 8,4 | 5,4 | 6,7 | 6,5 | 7,3 | 5,9 | 7,8 | 6,0 | 7,9 |
| Pencil Warpage (%) | 7,2 | 0,0 | 0,3 | 0,6 | 1,4 | 0,9 | 1,6 | 2,0 | 3,0 |

The double impregnated wood piece is produced in a process according to an embodiment of the invention comprising two process stages, in fact a first and a second process stage, each comprising several consecutive steps.

The first process stage of the wood modification process comprises a preceding drying step, a cutting step, a resting step, a first impregnation step and a subsequent drying step.

In the preceding drying step, raw and green, an untreated wood piece or wood material, for example in the form of blocks, lamellas or slats, is dried in a drying process in a stationary drying chamber of saturated initial moisture for the humidity condition between 10 and 25%. In an alternative, a continuous dryer may be used.

After drying the wood piece or wood material, a cutting step is carried out, whereby the wood piece or wood material that do not yet have the final dimensions of slats useful for pencil production, are cut into wood pieces from 45 to 84×4 to 7×140 to 186 mm.

The cutting step is followed by a resting step, whereby the dried and cutted wood piece should remain on rest for 2 to 15 days so that moisture is evenly distributed in the wood piece.

In the first impregnation step, the wood piece is exemplary fully impregnated with a first aqueous impregnating solution according to the formulations F1 to F8 comprising different impregnating agents acting as reactant crosslinkers. The impregnating agents are selected from the group consisting of 1,3-dimethylol-4,5-dihydroxyethylene urea or a derivative or modification thereof. Magnesium nitrate and Magnesium chloride are used as catalysts. Furthermore, the first impregnating solution comprises a siloxane based polyether as surfactant. The first impregnating solution is prepared in a metal tank equipped with a compatible agitator allowing the rapid homogenization of the mixture until the catalyst is completely dissolved.

The first impregnation process carried out comprises the following steps:
- Step a: The dried and cutted wood pieces are inserted in a pressure vessel with a capacity of 17 bar. For example, the dried and cutted wood pieces should be tied with arching tape on bales or packed in metal trolleys. The bales or metal trolleys are then inserted in the pressure vessel.
- Step b: A vacuum of 0.07 bar is applied for 15-30 minutes ("first vacuum step")
- Step c: The first impregnating solution is transferred into the pressure vessel.
- Step d: A pressure from 10 to 15 bar, exemplary 12 bar is applied ("high-pressure step")
- Step e: The first impregnating solution is removed from the inside of the pressure vessel.
- Step f: A vacuum of 0.07 bar is applied for 15-30 minutes ("second vacuum step")
- Step g: The impregnated wood pieces are removed from inside the pressure vessel.

During the subsequent curing step, the impregnated wood pieces are cured inside a kiln. The impregnated wood pieces may be stapled so that ventilation between them is possible and are inserted in a closed and thermally insulated metal kiln. The inside of the kiln may have about 8 bar saturated steam sprinklers. The impregnated wood pieces inside the chamber should be vaporized for a period of 12 to 24 hours so that the temperature inside the vessel reaches a temperature above 100° C.

After the curing step, the impregnated wood pieces can follow with a drying cycle inside the kiln following a drying cycle with maximum final temperature of 80-95° C. with time between 40 and 120 hours. In an alternative, the impregnated wood pieces can be removed from the inside of the kiln and dried in continuous dryer for 50-120 min with maximum temperature of 120-160° C. In both processes a final humidity of 10-20% is to be reached.

In the second process stage of the wood modification process, comprises a second impregnating step, whereby the once impregnated, cured wood pieces are exemplary fully impregnated with a second impregnation solution having 4 to 6 wt. % in total of paraffin and stearic acid, exemplary 5 wt %. as impregnating agent dispersed in water. The composition of the second impregnation solution is as follows:
- 92.57 to 96.57 wt.-% of water,
- 1.00 to 2.30 wt.-% of stearic acid,
- 0.70 to 1.40 wt.-% of ammonium hydroxide,
- 1.70 to 4.00 wt.-% of a paraffin wax, and/or
- 0.03 wt.-% of a defoamer.

The second impregnation process carried out comprises the following steps:
- Step a: The once impregnated, cured wood pieces are inserted in a pressure vessel with a capacity of 17 bar. For example, the dried and cutted wood pieces should be tied with arching tape on bales or packed in metal trolleys. The bales or metal trolleys are then inserted in the pressure vessel.
- Step b: A vacuum of 0.07 bar is applied for 15-30 minutes ("first vacuum step")
- Step c: The second impregnating solution is transferred into the pressure vessel.
- Step d: A pressure from 10 to 15 bar, exemplary 12 bar is applied ("high-pressure step")
- Step e: The second impregnating solution is removed from the inside of the pressure vessel.
- Step f: A vacuum of 0.07 bar is applied for 15-30 minutes ("second vacuum step")
- Step g: The double impregnated wood pieces are removed from inside the pressure vessel.

In a subsequent drying step, the double impregnated wood pieces should be dried in continuous dryer for 50-120 min with maximum temperature of 120-160° C. reaching the final humidity of 10-20%.

The impregnated wood piece obtained by the process described above is then used in the pencil production, in particular pencils are produced as described above comprising a lead and a shaft, wherein the shaft is made from or comprises such an impregnated wood piece or wood material.

In order to assess the sharpenability of the pencil, the pencils were sharpened in a testing machine developed for this purpose, in which a pencil comprising a sheath made of impregnated wood material is sharpened continuously for about 20 sec. It hast been shown that the pencils have a sharpening moment of less than 8 Ncm what is classed as being sharpenable with low expenditure of energy. The sharpening moment is deemed to be the average torque (in Ncm), ascertained during the sharpening process, needed to continuously sharpen a pencil with a diameter of 7.2±0.2 mm at a speed of 43 rpm, whereby the pencil has already been sharpened with a commercial conventional sharpener before.

Pencils produced having a shaft made of a double impregnated wood material according to the invention have a sharpening moment lower than 8 Ncm and thus lower than pencils having a shaft that is made of wood material being only impregnated with a paraffin wax emulsion.

The pencil warpage, thus a deviation of the end portions of the pencil from its longitudinal axis, is determined dropping or passing the pencil through a cylindric gauge, e.g. a metal tube, that holds any pencil with a deviation greater than 0.8 mm. A pencil which is held by this gauge is considerate a warped pencil. The pencils having a shaft made of a double impregnated wood material according to the invention show a significantly reduced pencil warpage of 3.0% at maximum. In comparison, pencils having a shaft that is made of wood material being only impregnated with a paraffin wax emulsion, show a pencil warpage larger than 7%.

In summary, it has been found out, that the composition and process for chemically wood modification combined with the paraffin wax emulsion impregnation according to the present invention reduce the sharpening torque and increase the warpage stability for pencils compared to pencils having a shaft that is made of wood material being only impregnated with a paraffin wax emulsion.

Product Names/Manufacturers:
1) Archroma GmbH, 4135 Reinach, Basel-Land, Schwitzerland
2) Evonik Industries AG, Rellinghauser Straße 1-11, 45128 Essen, Germany
3) Momentive Performance Materials, 260 Hudson River Road, Waterford, NY 12188, USA
4) Haifa Group, P.O. Box 15011, Matam-Haifa, 31905, Israel
5) Zechstein Minerals BV, Transportweg 15, 9645 KZ Veendam, Netherlands
6) SGS Agricultura e Indústria Ltda, Brazil
7) Usiquimica do Brasil Ltda, Brazil
8) Solven Solventes e Quimicos Ltda, Brazil

The invention claimed is:

1. Process for the production of impregnated wood pieces for use in pencil production, wherein the process comprises two process stages, namely a first process stage, comprising;
   a first impregnation step, in which an untreated wood piece is at least partially, impregnated with a first aqueous impregnating solution of an impregnating agent selected from the group consisting of 1,3-dimethylol-4,5-dihydroxyethylene urea or a derivative or modification thereof, and a catalyst, and
   a subsequent curing step, in which the impregnated wood piece is cured in a hot steam atmosphere at an elevated temperature above 100° C., and
   a second process stage comprising a second impregnation step, whereby the impregnated, cured wood piece is at least partially impregnated with a second aqueous impregnating solution of a wax emulsion paraffin based as an impregnating agent.

2. Process according to claim 1, wherein metal salts are used as catalyst.

3. Process according to claim 2, wherein the metal salts are selected from the group consisting of magnesium nitrate and/or magnesium chloride.

4. Process according to claim 1, wherein first aqueous impregnating solution further comprises a surfactant.

5. Process according to claim 4, wherein a polyether is used as surfactant.

6. Process according to claim 5, wherein a siloxane based polyether is used as surfactant.

7. Process according to claim 1, wherein the first aqueous impregnating solution comprises 79.2 to 97.85 wt.-% of water, 2.00 to 20.00% of the impregnating agent based on the solid content, 0.05 to 0.20 wt.-% of the surfactant, and/or 0.10 to 0.60 wt.-% of the catalyst.

8. Process according to claim 1, wherein the second aqueous impregnating solution comprises a fatty acid and/or ammonium hydroxide and/or a defoamer or any combination thereof.

9. Process according to claim 1, wherein the second aqueous impregnating solution comprises 92.57 to 96.57 wt.-% of water, 1.00 to 2.30 wt.-% of stearic acid, 0.70 to 1.40 wt.-% of ammonium hydroxide, 1.70 to 4.00 wt.-% of a paraffin wax, and/or 0.03 wt.-% of a defoamer.

10. Process according to claim 1, whereby the first impregnation step is carried out through a vacuum impregnation process comprising at least one vacuum step at a pressure of 0.01 to 0.1 bar for 15 to 30 minutes, and a high pressure step at a pressure of 10 to 15 bar for 1 to 3 hours, whereby the untreated wood piece is at least partially impregnated at the high pressure step, and/or the second impregnation step is carried out through a vacuum impregnation process comprising at least one vacuum step at a pressure of 0.01 to 0.1 bar for 15 to 30 minutes, and a high pressure step at a pressure of 10 to 15 bar for 1 to 3 hours, whereby the impregnated, cured wood piece is at least partially impregnated at the high pressure step.

11. Process according to claim 1, whereby the curing step is carried out in a hot steam atmosphere at a pressure of 7 to 9 bar for a period between 12 and 24 hours.

12. Process according to claim 1, whereby the first process stage comprises one or more of the following steps carried out before the first impregnation step:
   a preceding drying step for drying the untreated wood piece carried out in a continuous dryer or a stationary drying chamber of saturated initial moisture for the humidity condition between 10 and 25%, and/or
   a cutting step for cutting the untreated wood piece, and/or
   a resting step, whereby the untreated wood piece remains on rest for 2 to 15 days before carrying out the first impregnation step.

13. Process according to claim 1, whereby;
   the first process stage comprises a subsequent drying step for drying the impregnated, cured wood piece after the curing step, carried out with maximum final temperature of 80 to 95° C. with time between 40 and 120 hours or for 50 to 120 min with a maximum temperature of 120 to 160° C. in both processes reaching the final humidity of 10-20%, and/or whereby,
   the second process stage comprises a subsequent drying step for drying the wax emulsion impregnated wood piece for 50 to 120 min with maximum temperature of 120-160° C. reaching the final humidity of 10-20%.

14. Pencil having a lead and a shaft surrounding the lead, wherein the shaft is made from or comprises an impregnated wood piece obtainable by a process according to claim 1 and being at least partially impregnated with a first aqueous impregnating solution of an impregnating agent selected from the group consisting of 1,3-dimethylol-4,5-dihydroxyethylene urea or a derivative or modification thereof and a catalyst, and being at least partially impregnated with a second impregnating solution of a paraffin wax as an impregnating agent.

15. Pencil according to claim 14, wherein the wood piece is or comprises *Pinus* spp.

16. Pencil according to claim 15, wherein the wood piece is or comprises *Pinus caribaea* var *hondurensis* or *Pinus oocarpa*.

17. Pencil according to claim 14, wherein the pencil has a sharpening moment lower than 8 N·cm and/or a pencil warpage of 3.0% at maximum.

18. Process according to claim 1, wherein the second aqueous impregnating solution comprises a stearic acid.

* * * * *